INVENTOR.
ABRAHAM KOGAN

United States Patent Office 3,507,319
Patented Apr. 21, 1970

3,507,319
METHOD AND APPARATUS FOR EFFECTING HEAT TRANSFER
Abraham Kogan, 35a Trumpeldor Ave., Neve Shaanan, Haifa, Israel
Filed Apr. 17, 1968, Ser. No. 721,990
Int. Cl. F28c *3/14;* F28g *9/100*
U.S. Cl. 165—1                  16 Claims

ABSTRACT OF THE DISCLOSURE

A process and apparatus for exchanging heat by passing a plurality of pebbles by gravity through a liquid reservoir and then carrying the pebbles with a stream of liquid flowing at high velocity from the lower region of the reservoir to a level above the liquid where the liquid and pebbles are separated before the pebbles begin their next cycle through the liquid.

---

The invention relates to a novel process and apparatus for circulating pebbles through a liquid reservoir for the transfer of heat therein.

A heat transfer process and apparatus of this general type is described in the Kogan Patent No. 3,242,975 issued Mar. 29, 1966. In that heat exchange system heat is transferred from one body of liquid to another by a plurality of pebbles which flow by gravity successively through the two bodies of liquid transferring heat from the upper body to the lower body of liquid. The pebbles are then carried from the lower body to a level above the higher body by a mechanical conveyor before recycling the pebbles through the heat exchange system.

The object of the present invention is to provide an improved process and apparatus for circulating the heat transferring pebbles in a heat exchange system, and more particularly to eliminate the mechanical conveyor required for lifting the pebbles to the level from which they begin their descent by gravity.

Toward this end the present invention provides a novel heat transfer process and apparatus in which heat is transferred in a liquid reservoir by a plurality of pebbles falling by gravity through the liquid reservoir and in which the pebbles are carried with a stream of liquid drawn from the lower region of the liquid reservoir and pumped upwardly at high velocity through a conduit to a level above the liquid reservoir where the pebbles and the liquid are separated before the pebbles begin their descent by gravity through the reservoir.

In a specific embodiment of the present invention the pebbles are used to transfer heat from an upper warmer body of converted water to a lower cooler body of saline water to be distilled and a stream of the saline water is used to carry the pebbles from the lower region of the body of saline water to a level above the converted water. In this embodiment of the invention the saline water is separated from the pebbles above the body of converted water and returned to the body of saline water by a down flow passage which isolates the saline water from the converted water to prevent the contamination thereof. Also, provision is made for washing the pebbles before they come into contact with the body of converted water to prevent contamination thereof.

Figure 1:
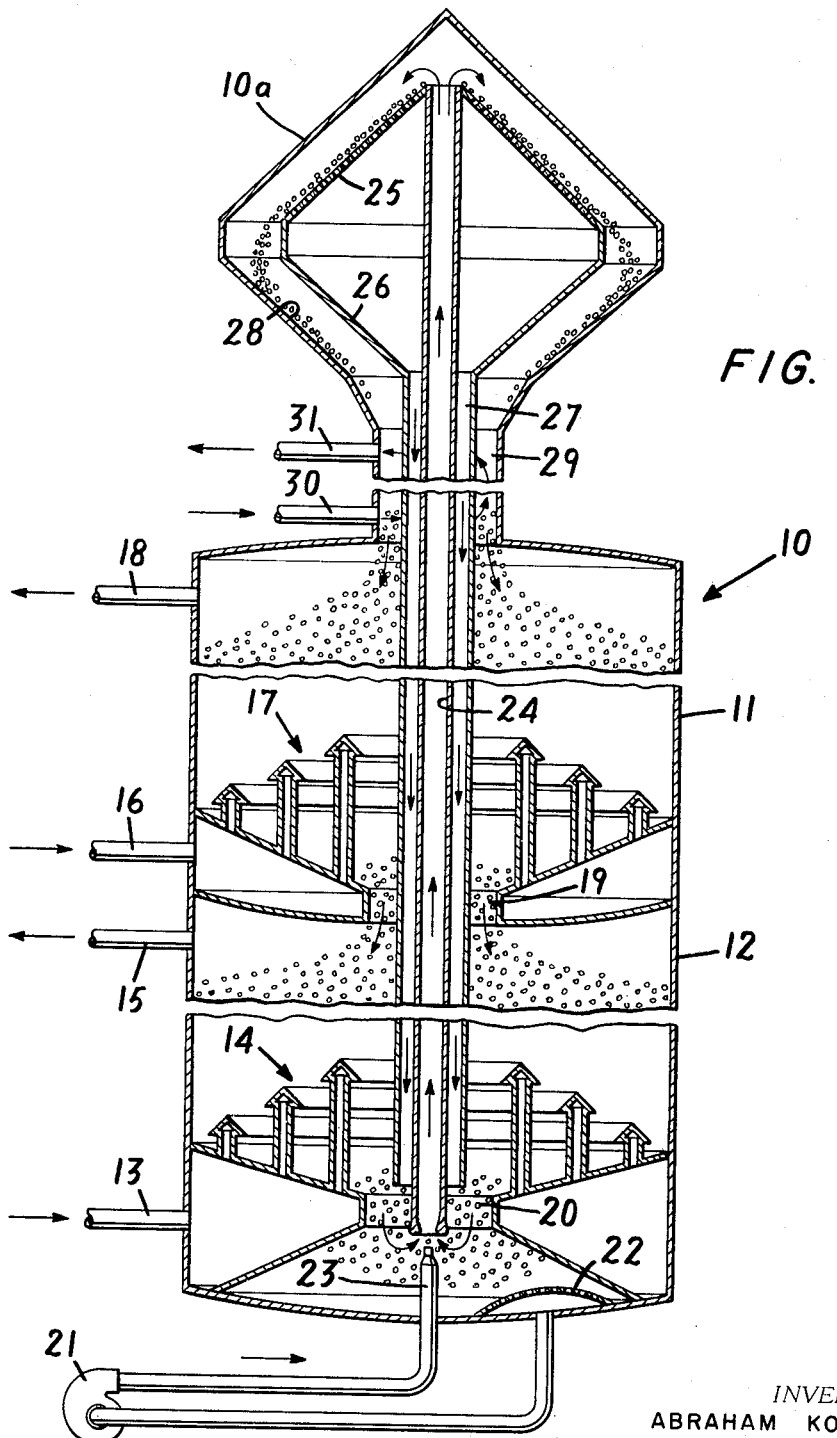
Figure 2:
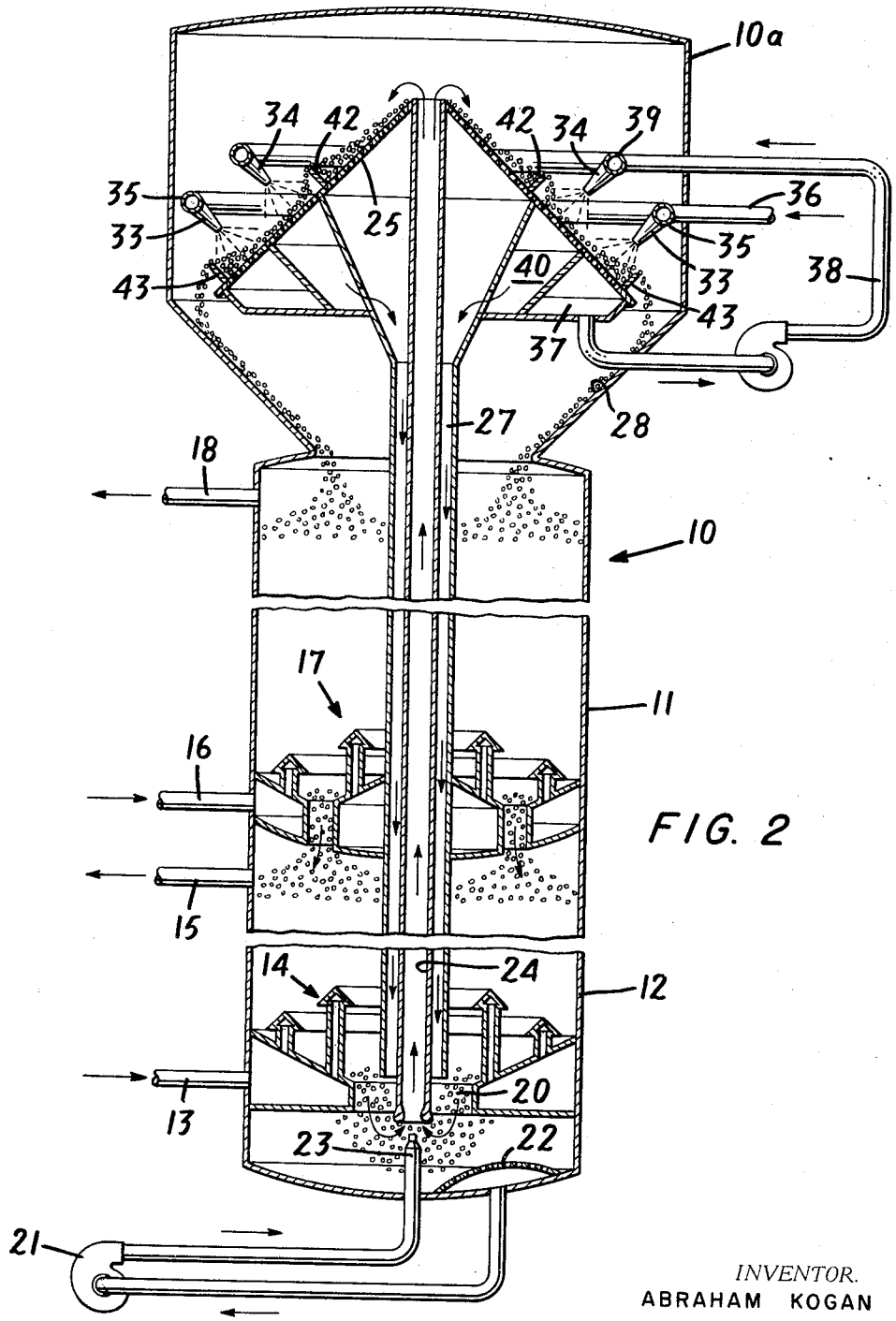

For a more complete understanding of the present invention reference can be made to the detailed description which follows and to the accompanying drawings in which:

FIGURE 1 is a cross sectional elevation illustrating a heat exchanger embodying the present invention; and FIGURE 2 is a cross sectional elevation illustrating an alternative embodiment of the invention.

Referring to FIGURE 1 of the drawings, a housing 10 provides a liquid reservoir for a body of liquid at high temperature in an upper region 11 of the housing and for a body of liquid at lower temperature in a lower region 12 of the housing. The heat exchange apparatus of the present invention may, for example, be used to transfer heat from a hot body of distilled or converted water in the upper region 11 to preheat a cold body of saline water in the lower region 12 before the saline water is introduced into the distillation chamber. The liquid is introduced into the lower region of the liquid reservoir through a conduit 13, passes upwardly through a diffuser manifold 14 and then is discharged from the liquid reservoir through a conduit 15. The liquid is introduced into the upper region of the liquid reservoir through a conduit 16, passes upwardly through a diffuser manifold 17 and then is discharged from the liquid reservoir through a conduit 18.

The pebbles fall by gravity through the upper body of liquid at higher temperature, pass through the central aperture 19 of the diffuser manifold 17, fall through the lower body of liquid at lower temperature, and then pass through the central aperture 20 of the diffuser manifold 14. In the process the pebbles transfer heat from the warmer body of liquid to the cooler body of liquid.

The pump 21 extracts a flow of liquid from the lower region of the liquid reservoir 10 through a strainer 22 and injects it with high velocity through a nozzle 23 into the lower end intake of a vertically disposed conduit 24. This stream of liquid entrains and carries with it by ejector action a flow of pebbles from the lower region of the liquid reservoir 10 through the conduit 24, lifting both liquid and pebbles through the conduit 24 and discharging them through the upper end of said conduit.

If the liquid drawn from the lower region of the liquid reservoir to carry the pebbles upwardly through the conduit 24 is saline water or other liquid which should not be mixed with the liquid in the upper region of the reservoir, it is desirable to separate out the carrier liquid from the pebbles and also to cleanse the pebbles before they return into contact with the liquid in the upper region 11 of the reservoir. Toward this end a downwardly sloped screen or perforated plate 25 is accommodated in an upper portion 10a of the housing and surrounds the upper end of the conduit at a level substantially above the upper region 11 of the liquid reservoir. The mesh of the screen permits passage of the carrier liquid therethrough, and the carrier liquid is collected in a funnel 26 beneath the screen and carried through a down flow conduit 27 which surrounds and is concentric with the conduit 24, returning the liquid to the lower region of the liquid reservoir.

The pebbles flow along the upper surface of the screen 25 to the discharge end thereof, and then pass through a neck passage 29 which surrounds the conduit 27. As they pass through the passage 29 the pebbles are washed by a flow of converted or distilled water admitted by the lower inlet conduit 30 and discharged through the upper conduit 31.

The pebbles thus provide a fluent mass of particles designed to effect heat transfer between the liquids in the upper and lower regions of the liquid reservoir. The individual pebbles may be constituted of any solid material of flowable size and form having heat capacity and conductivity characteristics to effect heat transfer from one body of liquid to the other. The pebbles are preferably substantially spherical and relatively uniform in size, but may be rod shaped or irregular in shape or size. Satisfactory results can be obtained by employing pebbles having specific gravities of from about 2 to 10 grams per cc. and specific heats and coefficiencies of thermal conductivity sufficient to effect heat transfer from one body of liquid to another. When employed in a desalinization system, the pebbles may suitably comprise metal balls composed of nickel, stainless steel or other nonrusting materials, or mineral particles, such as flint or basalt.

An alternative arrangement for separating the pebbles from the carrier liquid and washing the pebbles before they return into the liquid reservoir is illustrated in FIGURE 2 of the drawings.

In that embodiment contamination of the upper body of liquid by the pebbles is prevented by spraying the pebbles with water issuing from lower and upper arrays of jets 33 and 34. In order to economize on the amount of water needed for washing the pebbles the lower array of jets 33 are connected to a manifold 35 into which the water is introduced by a conduit 36. The water spray discharged through the lower array of jets passes through the screen 25 into a chamber or sump 37 from which it is pumped through a conduit 38 to a manifold 39 communicating with the upper array of nozzles 34. The water discharged from the nozzles 34 and passing through the screen 25 passes into a chamber or sump 40 from which it can either be introduced into the downtake passage 27 or discharged through a conduit.

Since the pebbles flowing downwardly along the upper surface of the screen 25 have a tendency to entrain large amounts of the carrier liquid due to surface tension and frictional resistance to flow through the perforations in the screen, a finite pressure head can be provided to maintain water flow through the perforations by providing upstanding walls or plates 42 and 43 on the upper surface of the screen. The wall 42 builds up a controlled thickness of pebble bed adjacent one side thereof so that a hydrostatic pressure head will be built up above the perforations and the water drainage through them is thus more effective. The lower wall 43 provides a similar controlled thickness of pebble bed for the same purpose at the discharge end of the screen.

The invention has been shown in preferred forms and by way of example only, and obviously many variations and modifications may be made therein without departing from the spirit of the invention. The invention, therefore, is not to be limited to any specified form or embodiment, except insofar as such limitations are set forth in the claims.

I claim:

1. A heat exchanger for transferring heat in a liquid reservoir comprising a housing for the liquid reservoir, a plurality of heat transfer pebbles moving by gravity through the liquid reservoir in heat exchange relation with the liquid therein for transferring heat therein, a conduit extending rfom the lower region of the liquid reservoir to a level above the liquid reservoir, and means for flowing the liquid from the lower region of the liquid reservoir at high velocity through the conduit to the upper discharge end of the conduit to carry therewith a flow of pebbles from the lower region of the liquid reservoir to the discharge end of the conduit for recycling the pebbles through the liquid reservoir, the pebbles being returned through the conduit in the presence of the liquid with which they were last in heat exchange relation.

2. A heat exchanger as set forth in claim 1 including a liquid separator adjacent the upper end of the conduit on which both the liquid and the pebbles are discharged, the liquid passing through the separator and the pebbles passing along the separator to the discharge end thereof.

3. A heat exchanger as set forth in claim 1 including a sloped perforated surface adjacent the upper discharge end of the conduit onto which both the pebbles and the pebble carrying liquid are discharged, the pebble carrying liquid flowing through the perforations and the pebbles flowing along the said sloped surface to the discharge end thereof, passage means communicating with the underside of said sloped surface for returning the pebble carrying liquid to the lower region of the liquid reservoir without contact with the liquid in the upper region of the liquid reservoir, and passage means for conducting the pebbles from the discharge end of said sloped surface into the upper region of the liquid reservoir.

4. A heat exchanger as set forth in claim 3 including means for washing the pebbles before they return to the upper region of the liquid reservoir.

5. A heat exchanger in accordance with claim 4 in which the means for washing the pebbles includes means for directing the pebble washing liquid onto the pebbles as they move along the perforated surface.

6. A heat exchanger as set forth in claim 4 in which the means for washing the pebbles includes means for circulating the pebble washing liquid through the passage means which returns the pebbles from the sloped surface to the upper region of the liquid reservoir.

7. A heat exchanger as set forth in claim 1 including multiple stage washing means for washing the pebbles as they flow from the discharge end of the conduit to the upper region of the liquid reservoir and means for circulating the washing water from a downstream stage washing means to an upstream stage washing means.

8. A heat exchanger as set forth in claim 1 including means for circulating a liquid at one temperature in the lower region of the liquid reservoir and means for circulating a liquid at different temperature in the upper region thereof.

9. A heat exchanger as set forth in claim 1 in which the conduit is vertically disposed substantially centrally in the liquid reservoir and including a downwardly sloped perforated surface surrounding the upper end of the conduit for passing the pebble carrying liquid therethrough and carrying the pebbles to the discharge end of the sloped surface, funnel means beneath said sloped surface for collecting the liquid, and passage means through the liquid reservoir and surrounding the conduit for receiving the pebble carrying liquid from the funnel and returning it to the lower region of the liquid reservoir.

10. A heat exchanger as set forth in claim 1 including a downwardly sloped liquid separating surface which passes the pebble carrying liquid therethrough and carries the pebbles to the discharge end thereof, and a wall upstanding from said sloped surface to build up a layer of pebbles of predetermined height on said sloped surface.

11. A heat exchanger for transferring heat from one body of liquid to another using a plurality of pebbles comprising a housing containing one liquid in the lower region and another liquid in the upper region, a conduit having an intake communicating with the lower region of the housing and an upper discharge end above the upper liquid region, means for circulating liquid at high velocity from the lower region of the housing upwardly through the said conduit to carry with the liquid a stream of the pebbles from the lower region of the housing to the upper discharge end of the conduit, a liquid separator adjacent the upper end of the conduit on which both the liquid and the pebbles are discharged, the liquid passing through the separator and the pebbles passing along the upper surface of the separator and falling by gravity through the housing from the upper region to the lower region thereof to transfer heat from the one liquid to the other, and a down flow passage returning the separated liquid to the lower region of the housing while isolating the separated liquid from the upper region liquid.

12. A process for transferring heat in a liquid reservoir comprising moving a plurality of heat transfer pebbles through a liquid reservoir to transfer heat therein, flowing the lower region of the liquid from the liquid reservoir upwardly at high velocity through a conduit to draw therewith pebbles from the lower region of the liquid reservoir, and discharging the liquid and the pebbles from the upper end of the conduit to permit recycling of the pebbles through the liquid reservoir.

13. A process as set forth in claim 12 including separating the pebble carrying liquid from the pebbles and returning the pebble carrying liquid to the lower region of the liquid reservoir while isolating the pebble carrying liquid from the liquid in the upper region of the reservoir.

14. A process as set forth in claim 12 including washing the pebbles discharged from the upper end of the conduit before they return to the upper region of the liquid reservoir.

15. A process as set forth in claim 12 in which the liquid in the upper region of the liquid reservoir is of higher temperature and lower salinity and the liquid in the lower region thereof is of lower temperature and higher salinity, and in which the pebbles flow through the liquid reservoir by gravity and are returned to the upper discharge end of the conduit in the presence of the liquid with which they were last in heat exchange relation.

16. A heat exchanger as set forth in claim 1 including a liquid in the upper region of the reservoir which is of higher temperature and lower salinity and a liquid in the lower region of the reservoir which is of lower temperature and higher salinity, and in which the pebbles flow through the liquid reservoir by gravity and are returned to the upper discharge end of the conduit in the presence of the liquid with which they were last in heat exchange relation.

References Cited
UNITED STATES PATENTS

| | | | |
|---|---|---|---|
| 3,242,975 | 3/1966 | Kogan | 165—2 |
| 3,291,197 | 12/1966 | Kollerup | 165—95 |

MEYER PERLIN, Primary Examiner

C. SUKALO, Assistant Examiner

U.S. Cl. X.R.

165—95, 106; 302—53